(12) United States Patent
Hudlow

(10) Patent No.: US 11,624,181 B2
(45) Date of Patent: Apr. 11, 2023

(54) DISASTER-RESISTANT STRUCTURE AND METHOD FOR SECURING DISASTER-RESISTANT STRUCTURES TO A BODY OF CAST MATERIAL

(71) Applicant: Jessie Edward Hudlow, Irving, TX (US)

(72) Inventor: Jessie Edward Hudlow, Irving, TX (US)

( * ) Notice: Subject to any disclaimer, the term of this patent is extended or adjusted under 35 U.S.C. 154(b) by 42 days.

(21) Appl. No.: 15/242,657

(22) Filed: Aug. 22, 2016

(65) Prior Publication Data
US 2018/0051456 A1 Feb. 22, 2018

(51) Int. Cl.
*E04B 1/16* (2006.01)
*E04H 9/14* (2006.01)
(Continued)

(52) U.S. Cl.
CPC ............. *E04B 1/161* (2013.01); *E04H 9/029* (2013.01); *E04H 9/14* (2013.01); *E04B 1/0007* (2013.01); *E04B 2103/02* (2013.01); *Y02A 50/00* (2018.01)

(58) Field of Classification Search
CPC .... E04B 1/0007; E04B 1/161; E04B 2103/02; E04H 9/029; E04H 9/14; Y02A 50/14
(Continued)

(56) References Cited

U.S. PATENT DOCUMENTS 4,558,308 A * 12/1985 Ciordinik ............. G08B 13/124
254/134.4
4,694,629 A * 9/1987 Azimi ........................ E04C 3/22
52/223.7
(Continued)

OTHER PUBLICATIONS

FEMA P-320, Taking Shelter from the Storm: Building a Safe Room for Your Home or Small Business (2014).
(Continued)

*Primary Examiner* — William V Gilbert
(74) *Attorney, Agent, or Firm* — M. Jason Spivey

(57) ABSTRACT

The disaster-resistant structure secured to a body of cast material comprises at least one flexible cable to resist high loads, debris impact and other hazards that occur due to high winds, tornadoes, earthquakes, or other severe storms. The structure is secured to the body of cast material by at least one flexible cable passing through. At least one hollow tube imbedded into the body of cast material. The flexible cable is looped around the structure in a substantially vertical plane, passed through the tube, traveling inside the walls and ceiling. The ends of the flexible cable are connected using any conventional means for connecting cable ends. The structure is also secured by at least one other flexible cable that is looped around the room structure in a substantially horizontal plane located within the walls and secured using any conventional means for connecting cables.

In the preferred embodiment, the walls are also secured together by at least one other flexible cable that is looped around the room in a substantially horizontal plane and secured to the structure's framing. The ends of the horizontally looped flexible cable are secured to the structure's framing such as the door framing with a connector, hook, or other means of securing the end of a cable to a framing member. The at least one horizontally looped flexible cable is located within the walls. The vertically looped and horizontally looped flexible cables form a network of cables around the structure, located within the walls of the structure. In the preferred embodiment, the network of flexible cables may be encased in a cast material placed into the wall cavities and above the ceiling panel.

14 Claims, 6 Drawing Sheets

(51) Int. Cl.
*E04H 9/02* (2006.01)
*E04B 1/00* (2006.01)

(58) Field of Classification Search
USPC ................. 52/79.11, 378, 379, 380, 383
See application file for complete search history.

(56) References Cited

U.S. PATENT DOCUMENTS

| | | | | |
|---|---|---|---|---|
| 6,119,417 | A * | 9/2000 | Valverde | ............... E04B 7/02 |
| | | | | 52/223.7 |
| 6,415,558 | B1 | 7/2002 | Cherry | |
| 6,438,906 | B1 | 8/2002 | Komarowski | |
| 6,532,710 | B2 | 3/2003 | Terry | |
| 7,237,362 | B2 | 7/2007 | Bishop | |
| 8,646,225 | B2 | 2/2014 | Wirtz | |
| 8,919,057 | B1 * | 12/2014 | Dupray | ............... E04C 2/044 |
| | | | | 52/223.14 |
| 8,984,831 | B1 | 3/2015 | West | |
| 2005/0050828 | A1 * | 3/2005 | Gallix | ............... E04B 1/3441 |
| | | | | 52/633 |
| 2006/0171783 | A1 * | 8/2006 | Freitag | ............ E02D 29/0241 |
| | | | | 405/262 |
| 2008/0216445 | A1 * | 9/2008 | Langer | ............... E04B 1/165 |
| | | | | 52/745.09 |
| 2011/0036020 | A1 * | 2/2011 | Curry, III | ............... E04H 9/14 |
| | | | | 52/23 |
| 2015/0082714 | A1 | 3/2015 | Guion | |

OTHER PUBLICATIONS

FEMA P-361, Safe Rooms for Tornadoes and Hurricanes: Guidance for Community and Residential Safe Rooms, Third Edition (2015).
FEMA, Taking Shelter from the Storm, Building a Safe Room for your Home or Small Business, FEMA P-320, $4^{th}$Ed.,(Dec. 2014).
FEMA, Safe Rooms for Tornadoes and Hurricanes, Guidance for Community and Residential Safe Rooms, FEMA P-361, $3^{rd}$Ed. (Mar. 2015).

* cited by examiner

DISASTER-RESISTANT STRUCTURE AND METHOD FOR SECURING DISASTER-RESISTANT STRUCTURES TO A BODY OF CAST MATERIAL

FIELD OF THE INVENTION

The present invention is a novel, disaster-resistant structure and a method for assembling or constructing the structure, that incorporates flexible cable to secure and reinforce a structure or a structural member, such as a building, a room, closet, enclosure, wall or a roof to a body of cast material such as a foundation, grade beam, base, platform, floor, or slab, to resist the very high loads, upward loads, or impact of debris and other hazards that may occur due to high winds, tornadoes, earthquakes, or other severe storms.

BACKGROUND OF SECURING METHODS FOR BODIES OF CAST MATERIAL

The most common method to secure two bodies of cast material such as concrete constructed at different times is to prepare for the attachment of the second body of cast material by placing rods such as steel rebar partially within the first body of cast material, so that the rods are partially protruding from the first body of cast material. The protruding rods are then encapsulated in the second body of cast material, when it is formed thus securing the two bodies to each other. If other objects are to be secured to a body of cast material the process is often accomplished by embedding a steel rod with the threaded end protruding in order to receive the object to be secured. If the body of cast material is already installed and in a solid state with no rods or bolts protruding to receive a second cast body or object, then typically holes are drilled in the body of cast material and rods or bolts are installed.

BACKGROUND OF REINFORCING METHODS

The most common method of reinforcing concrete is to install stiff rods, such as steel rebar or in some cases a welded network of stiff wire inside removable concrete forms or inside the voids of concrete blocks. The rods or wire are added to give the brittle concrete the tensile strength that is required to withstand all loads that are not strictly compressive. The cutting, bending and tying of rods or wire is costly and labor-intensive. The process of building removable forms for the concrete, or the installation of concrete block walls is also costly and labor-intensive. The cost of materials and labor to install this type of reinforcing often makes construction more expensive and impractical. This is certainly the case when it comes to the construction of certain building features such as safe rooms. The present invention is a novel and innovative way to eliminate the need for temporary forms, concrete blocks and the labor-intensive installation of costly rods or stiff wire reinforcing, thus greatly reducing the cost of constructing building features such as safe rooms.

BACKGROUND OF THE INVENTION

The state-of-the-art disaster-resistant structure is a structure that is constructed entirely underground. There is however a growing desire to improve the disaster resistance of buildings used as homes and businesses or to fortify and strengthen a room or an enclosure such as a safe room or strong room within such a building. A determining factor in the resistance of a structure to rare and very high externally-imposed side loads and upward loads is the effectiveness of the connection of the roof to the building and the connection of the building to the ground or the connection of the enclosure within the building to the ground. In most cases a heavy concrete foundation is already in place and is used for the normal function of the building. Generally such a foundation is designed to provide a stable and flat surface to resist the downward loads such as the weight of the building and all the contents of the building. Embedded J-bolts that are typically used to connect the wood frame walls to the concrete foundation provide reasonable resistance to ordinary lateral forces and some resistance to upward forces. However, in resisting any significant upward loads, these bolts are limited by the strength of the wood that they are bolted through. Disaster loading often includes upward forces and impact forces that exceed by a very large margin the capacity of standard wall anchoring. A system is needed that is able to secure an enclosed structure to the foundation with structural components that are not only strong enough to resist the disaster forces, but that are at the same time able to better distribute these forces into the foundation and across the structural components of the structure so that localized structural failure is substantially reduced. The recommended method detailed in FEMA P320 for anchoring a disaster-resistant structure is to install steel rebar that protrudes from the foundation with the proper size, length, and spacing suitable for the secondary pouring of walls to encapsulate the exposed steel rebar. This anchoring method is based on conventional loads, not impact loads. If any damage occurs such as cracking, the anchor quickly loses integrity. The flexible cable loops used in the present invention provide a superior function over conventional methods by holding the enclosed structure down even if a portion of a wall is damaged by severe impact damage.

The impact of storm debris or even projectiles from firearms can readily penetrate the most common walls in residential buildings. The addition of a layer of concrete in the wall of the enclosed structure is a cost-effective way to add resistance to objects or debris that hit the walls at high speeds. If the walls are pounded by debris there is the chance that some cracking and local structural damage may occur. In the present invention a network of continuously looped flexible cables is more resistant to catastrophic failure than the conventional method of using steel rebar anchoring that is overlapped but not continuous.

BRIEF DESCRIPTION OF DRAWINGS

The novel features of the embodiments of the present invention are set forth in the appended claims. However, the embodiments themselves, as well as a preferred embodiment, and further objectives and advantages thereof, will best be understood by reference to the following detailed description when read in conjunction with the accompanying drawings, wherein:

Figure 1:
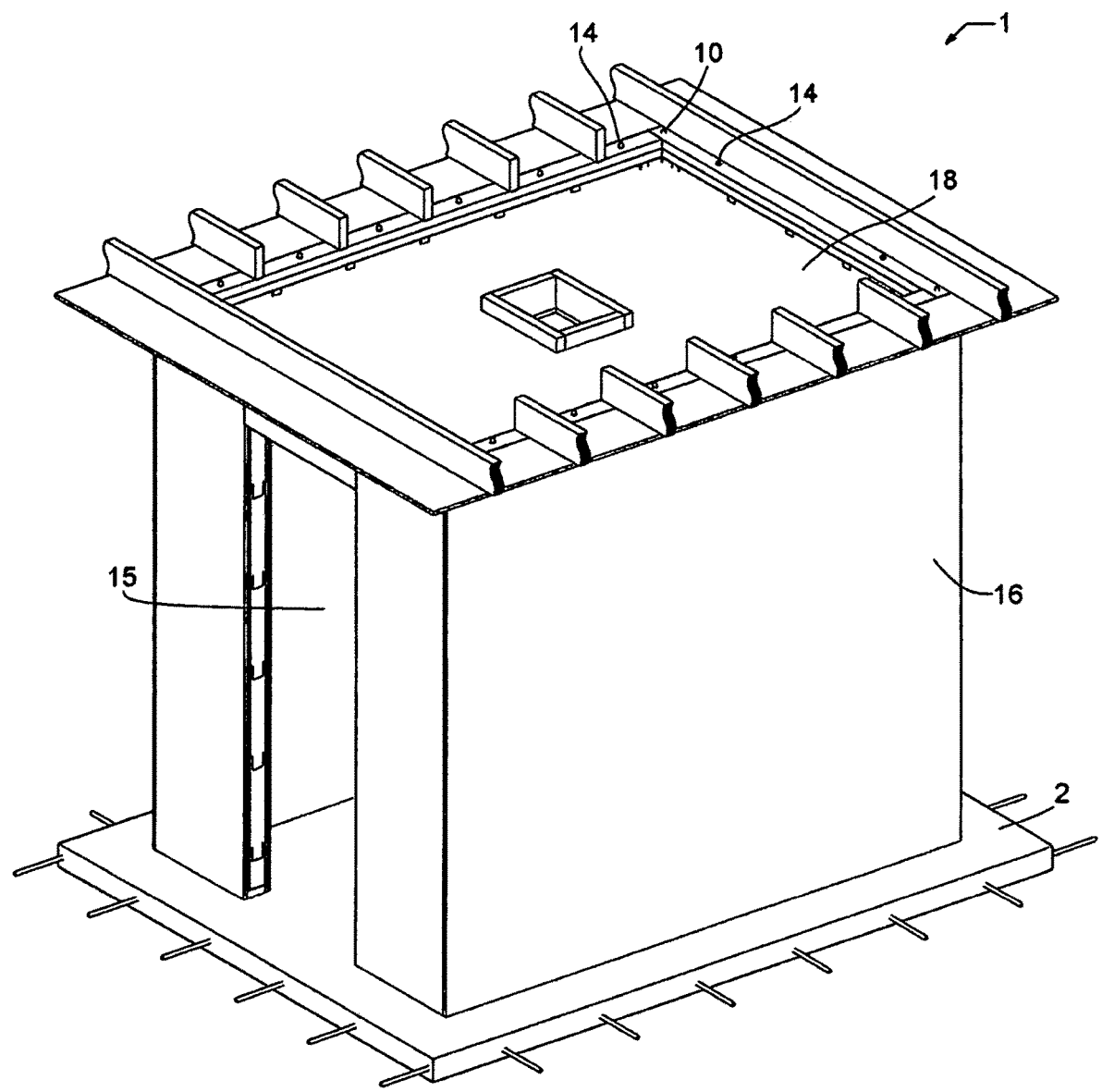
FIG. 1 is an oblique, three-dimensional drawing of a safe room as it might appear in a preferred embodiment of the present invention.

While the construction method and assembly process can accommodate various modifications and alternative forms, specific embodiments thereof have been shown by way of an example of a safe room in the drawings and are herein described in detail. The invention as set forth in the provided claims is not limited by the embodiments presented, and may be embodied in various other forms and applications and remain within the spirit and scope of this disclosure.

DESCRIPTION OF THE INVENTION/PREFERRED EMBODIMENT

Figure 2:
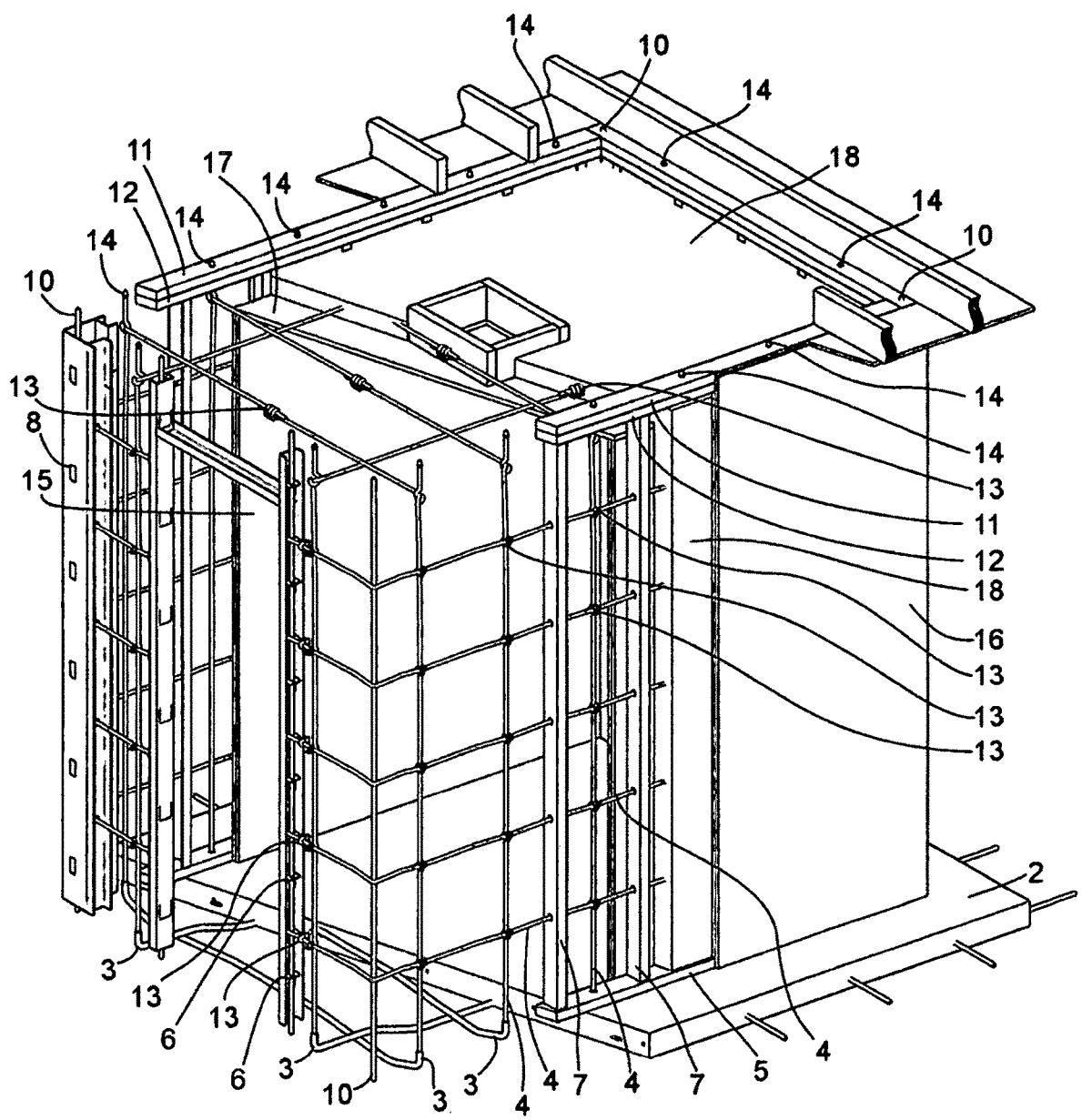
FIG. 2 is a partially cut-away view of FIG. 1, depicting most of the components of the present invention's securing system, reinforcing network, and assembly process.
Figure 3:
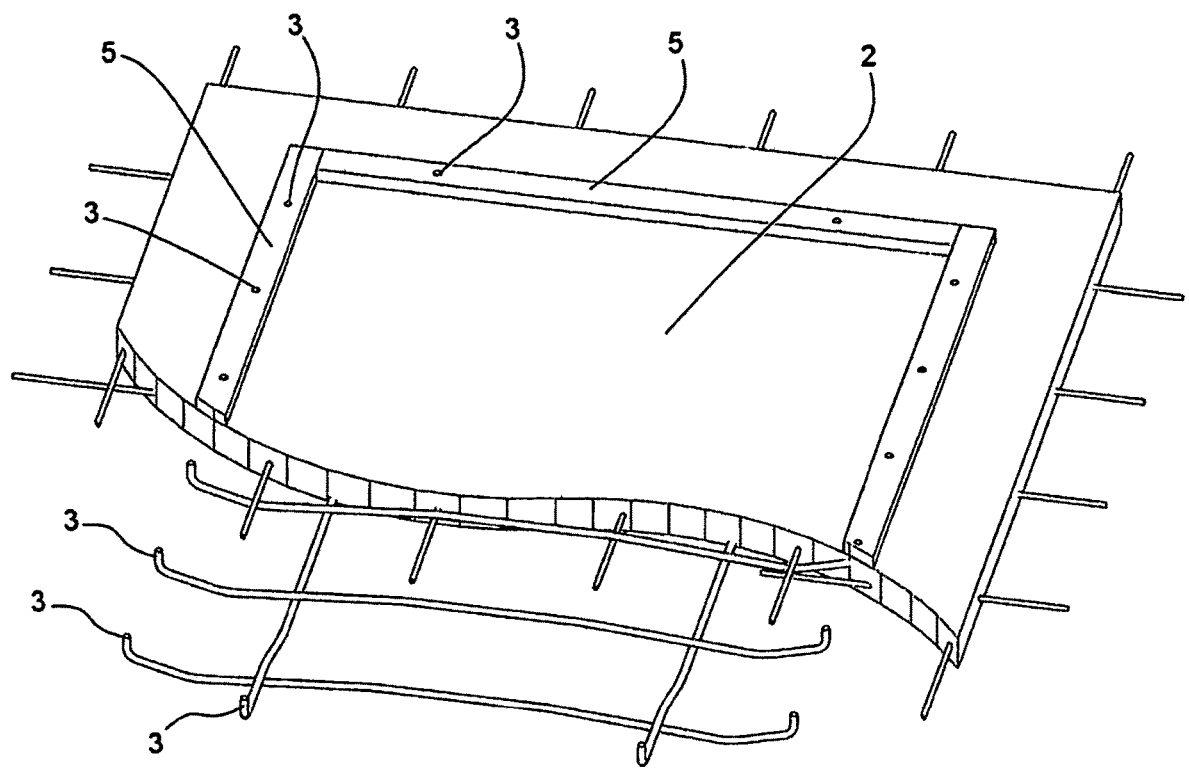
FIG. 3 is a three-dimensional view of a foundational section, showing how the tubes are partially imbedded (and may be woven in and out of the conventional reinforcement) to provide paths for the flexible cables.
Figure 4:
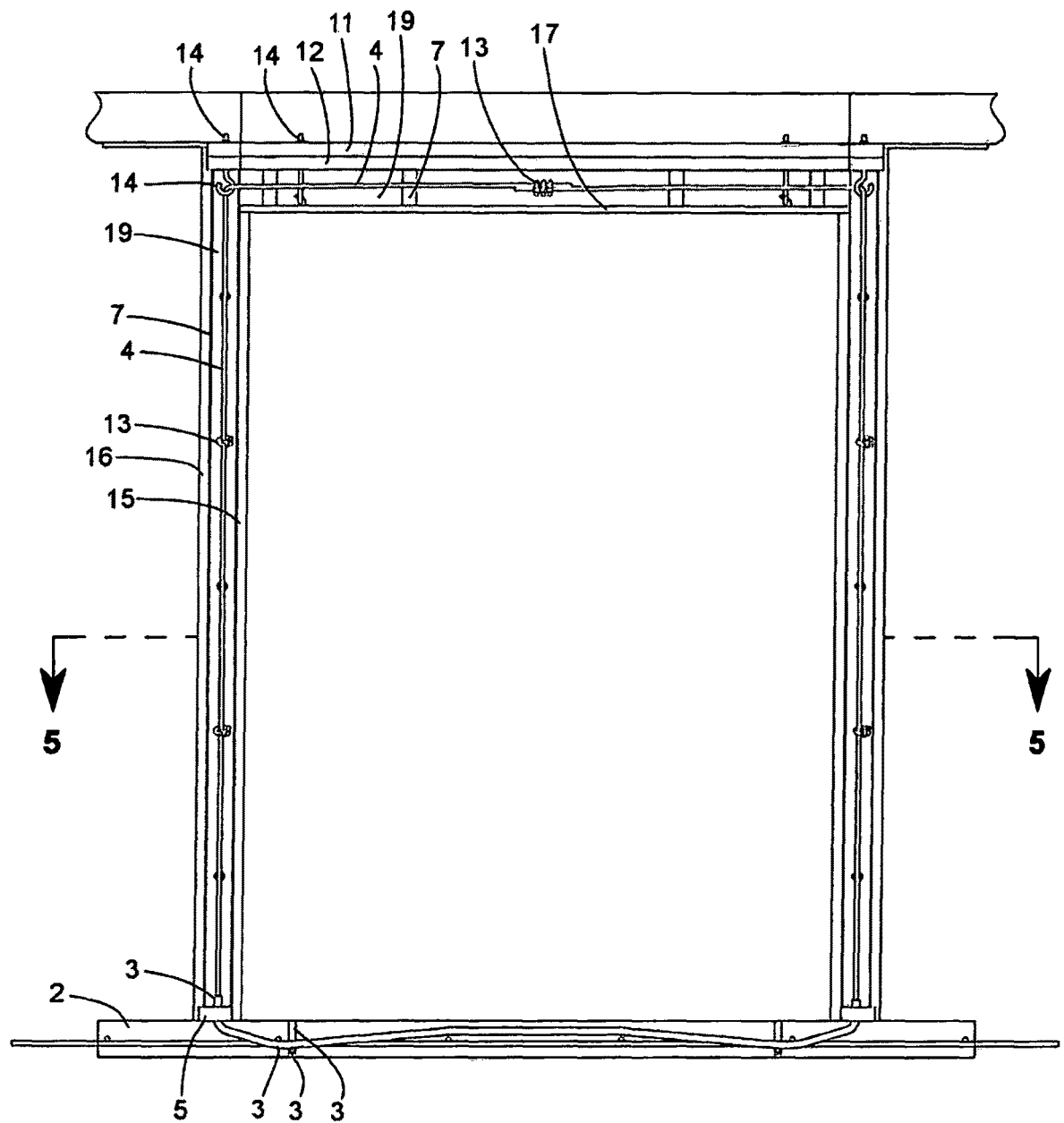
FIG. 4 is a cross-sectional elevation view (taken along the line indicated in the plan view of FIG. 5), showing a flexible cable through the tube in the foundation and passed (in a vertical plane) all the way around through the framework of the room.
Figure 5:
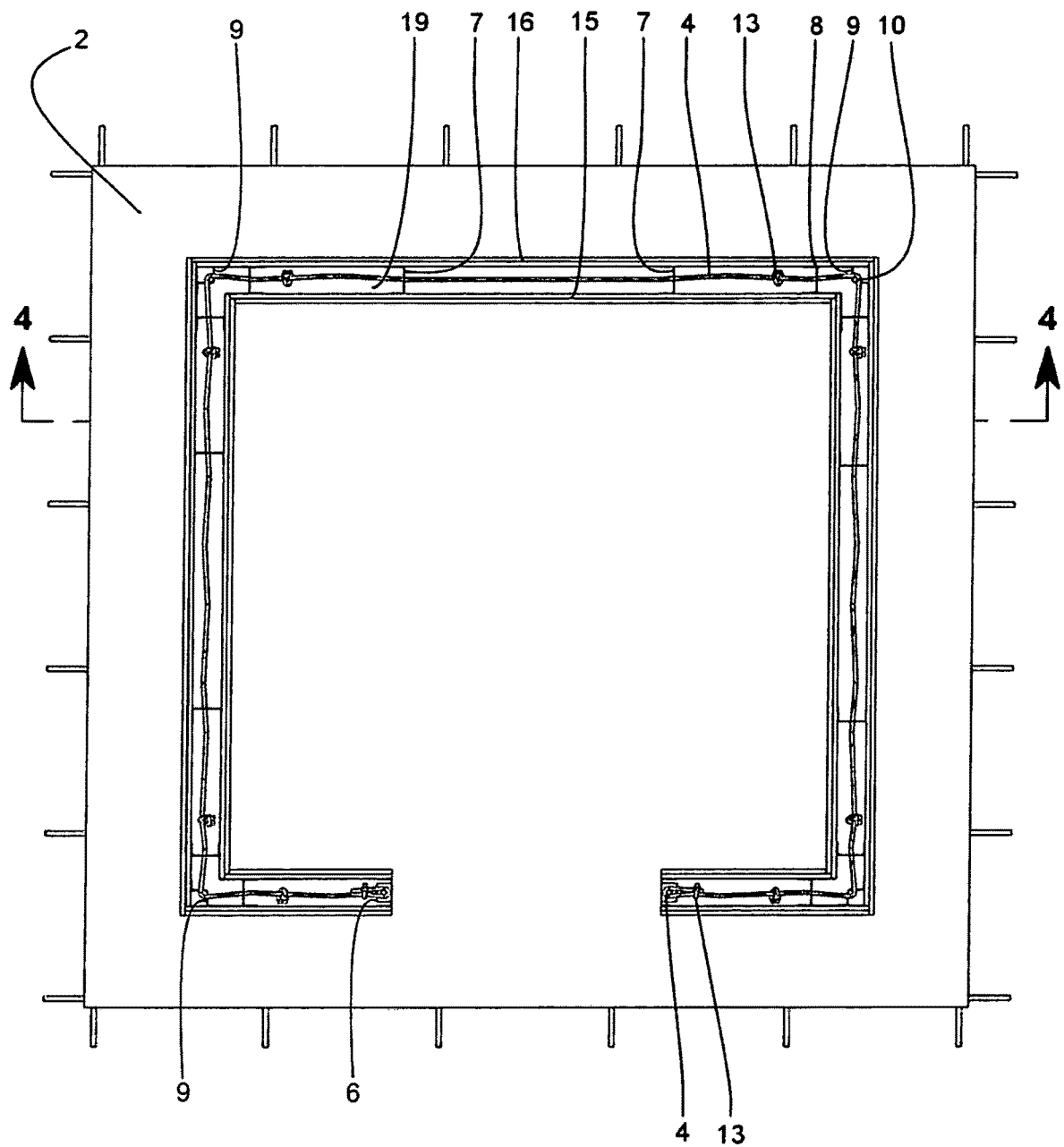
FIG. 5 is a cross-sectional plan view (taken along the line indicated in the elevation view of FIG. 4), showing a flexible cable installed horizontally around the room from one side of the door opening to the other side of the door opening.

The present invention applies to any structure (such as a building, room, closet, enclosure, or wall) for the purpose of making it disaster-resistant. One preferred embodiment is a structure (1) such as a safe room or strong room within a residential or business building. FIG. 1 illustrates such a safe room (1). FIG. 2 provides a partially cut-away view of the structure (1) to show components of the structure (1) including: a foundational body of cast material (2), embedded tubes (3), flexible cables (4), bottom plate (5), door rod connector (6), c-channel metal wall stud (7), wall corner form (8), corner rod connector (9), vertical support rod (10), upper top plate (11), lower top plate (12), cable clamp/connector (13), eye bolt (14), inner wall panel (15), outer wall panel (16), ceiling panel (17), and concrete fill (18). This preferred embodiment of a safe room may be envisioned as follows:

- Referring to FIG. 2 and FIG. 3, a conventional concrete slab foundation (2) is installed with the added feature of at least partially embedding tubing (3) within the foundation prior to or during installation of the foundation (2);
- Referring to FIG. 2 and FIG. 4, conventional framing is installed, including conventional members such as bottom plates (5), wall studs (7), and top plates (11, 12);
- Referring to FIG. 2, FIG. 4, and FIG. 5, special components are added within the framework for the safe room, including wall corner forms (8), vertical support rods (10) at each corner and on either side of the door opening, and eyebolts extending downward from the top plates (11, 12). The corner vertical support rods (10) are secured in place within the wall corner forms (8) by corner rod connectors (9), and the vertical support rods on either side of the door opening are secured to studs (7) by door rod connectors (6);
- Referring to FIG. 2 and FIG. 4, flexible cable (4) is passed through the embedded tube (3) in the foundation (2) and looped in a substantially vertical plane within the framework of the safe room structure (1) by passing the two ends of the flexible cable up between the studs of two opposite walls, through eyebolts at the tops of the walls, and across the ceiling to meet one another, and connecting these two ends of the flexible cable (4) to one another with a cable connector (13);
- Referring to FIG. 2 and FIG. 5, flexible cable (4) is looped in a substantially horizontal plane within the walls around the structure (1) by securing one end of the cable (4) with a cable connector (13) to the vertical support rod (10) on one side of the door opening, passing the cable through holes in the studs (7) and around vertical support rods at the corners (10) within the hollow wall corner forms (8), and securing the other end of the flexible cable (4) with a cable connector (13) to the vertical support rod (10) on the other side of the door opening;
- Referring to FIG. 2 and FIG. 4, the wall and ceiling framing is completed by installing a ceiling panel (17), inner wall panels (15), and outer wall panels (16), and concrete fill is added to encase the network of vertical and horizontal cable loops within the walls and ceiling. The weight of the concrete on the ceiling panel is supported on the underside by temporary vertical supports at the time the concrete is added to the walls and the ceiling.

Figure 6:
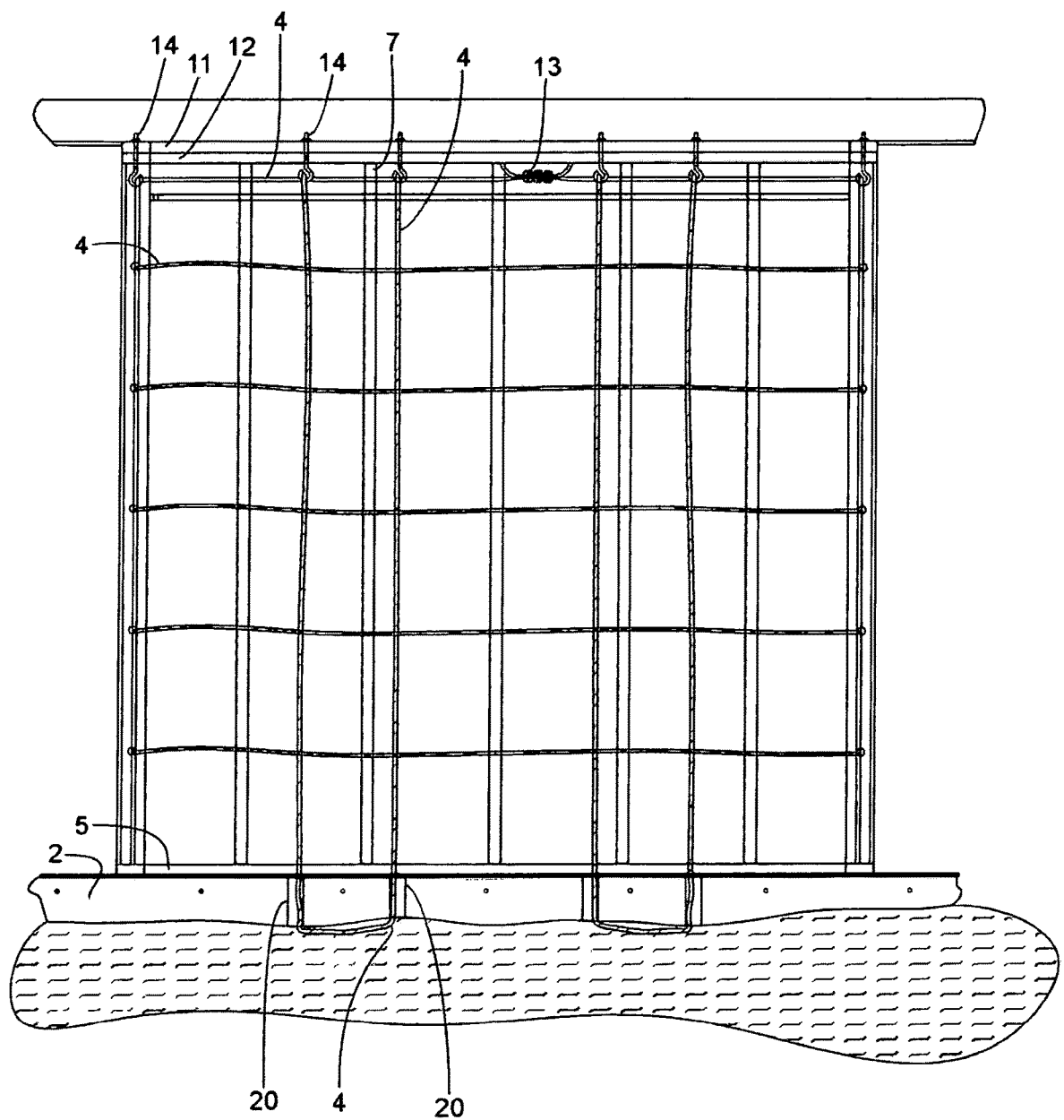
FIG. 6 is an elevation view of the safe room showing flexible cable members passed through holes cut in a pre-existing foundation (as an alternative to tubes embedded in a new foundation).

Referring to FIG. 3 and FIG. 4, a primary distinctive feature of this design is the use of flexible cable (4) rather than conventional rods or rigid steel rebar to secure the structure to the concrete slab foundation (2). The securing function is achieved in new construction by creating a loop path around the structure (1) that includes partially imbedding tubes (3) in the concrete slab foundation (2) and passing flexible cables (4) through the tubes (3) and around, or integrating them in, the walls and ceiling of the structure (1) (see FIG. 4) to secure the walls of the structure (1) to the concrete slab foundation (2). The tubes (3) may be formed to take an indirect lateral path that adds substantially more "pull-out" strength with substantially less concrete added or in some cases no additional concrete added to the foundation (2) to achieve the same or better resistance to upward forces. Referring to FIG. 2, one advantage of the present invention is that the concrete fill (18) encasing the flexible cables (4) in the wall cavities (19) may be thinner and lighter than conventional stand-alone concrete walls or walls incorporating concrete blocks, and in most cases the concrete-filled walls will not exceed the weight-loading capacity of the standard slab thickness. Most of the advantages of the present invention can also be gained in a retrofitted version of the design. In the retrofit case of securing a structure (1) in an existing building, the installation of the flexible cable (4) has to be accomplished without the benefit of the tubes (3) already being in place in the body of cast material such as a concrete slab foundation (2). Referring to FIG. 6, the connection to the concrete slab foundation (2) can still be made by looping the flexible cable (4) into and out of holes (20) cut in the existing concrete slab foundation (2) for this purpose. In most cases the holes (20) can be located so the flexible cable (4) includes a section of the concrete slab foundation (2) that contains some steel reinforcement. Even without the benefit of the flexible cable being passed through the foundation by means of tubes (3) or holes (20), many of the advantages of the present invention may still be gained by vertically looping the flexible cable (4) through and over the framing of the structure, such that the two ends of the cable (4) may be secured, anchored, attached, or otherwise connected to the body of cast material (2) by the use of eye bolts or any other means of connection. In any of these embodiments or adaptations of the present invention, the use of flexible cables (4) in place of conventional rods or rigid steel rebar as a securing system has the additional advantage of better distributing the securing forces across the entire structure because the flexible cables (4) can be looped from the body of cast material (2) over the top of the structure (1).

Referring to FIG. 4 and FIG. 5, another primary distinctive feature of this design is the effective substitution of flexible cables (4) for conventional rods or rigid steel rebar to reinforce the walls of the structure (1). The use of flexible cables (4) also has the advantage that these flexible cables (4) may be installed into a network of loops that act to keep the structure (1) substantially intact even if cracking of the structural members of the structure (1) or distortion of the shape of the structure (1) has occurred. In the preferred embodiment, a typical safe room would probably have two or more vertically looped flexible cables (4) along the longer side of the room and two or more vertically looped flexible cables (4) along the shorter side the room. These vertically looped flexible cables (4) connect the concrete slab foundation (2) to the walls and ceiling of the structure (1) in a continuous fashion (see FIG. 4). Additional loops of flexible cables (4) may be installed horizontally inside the walls of the structure (1), and spaced at different elevations (see FIG. 5). This network of flexible cables (4) is especially helpful in resisting catastrophic failures due to local damage to the structure (1). No current design maintains the structure's (1) integrity to this degree if damage or distortion of the structure (1) occurs.

In addition to a superior securing system and a strong reinforcement of the structure (1), the present invention allows for the integration of the structure (1) into conventional building framing in such a way that the structure (1) can be completely functional as a closet, laundry room, bath room or any type of room with modest pre-planning requirements. The walls of the structure (1) may be of standard construction, thickness and dimensions utilizing standard, dimensional materials including wood and metal framing members. Conventional sheathing or wood sheathing allows for mounting or attaching items to the wall with ordinary fasteners, which is not practical with current methods of safe room construction using concrete blocks for wall framing.

What is claimed is:

1. A structure secured to a body of cast material, which comprises:
   (a) an at least one wall;
   (b) an at least one ceiling;
   (c) an at least one opening respectively receiving at least one securable door;
   (d) an at least one tube, said at least one tube being at least partially embedded in the body of cast material and comprising a material selected from the group of plastics and metals;
   (e) an at least one vertical flexible cable having two ends, said at least one vertical flexible cable being looped around the entire structure in a plane which is substantially perpendicular to the body of cast material, said at least one vertical flexible cable being at least partially within the at least one wall and at least partially within the at least one ceiling and at least partially enclosed in the at least one tube, wherein the at least one flexible cable is comprised of steel, each of the two ends are connected forming a complete loop;
   (f) an at least one horizontal flexible cable having two ends, said horizontal cable being looped around the structure in a plane which is substantially parallel to the body of cast material and at least partially within the at least one wall, wherein the at least one other flexible cable is comprised of steel; and
   (g) an at least one connector, said at least one connector connecting said respective ends of said at least one vertical flexible cable, said at least one connector being selected from the group consisting of clamps, sleeves, clips, crimps, turnbuckles, hooks, ball and strap fittings, strap forks, ball and shanks, threaded fittings, strap eyes, eyelet fittings, plugs, threaded plugs, ball end plugs, and ties.

2. The structure of claim 1, which further comprises an at least one wall corner form, said at least one wall corner form comprising a material selected from the group consisting of metal, wood, and cardboard and connected to the at least one wall.

3. The structure of claim 1, which further comprises an at least one panel, said at least one panel comprising a material selected from the group consisting of metal, wood, plastic, sheetrock and composite and affixed to the at least one wall.

4. The structure of claim 1, which further comprises a cast material within the at least one wall and on top of the at least one ceiling.

5. The structure of claim 1, wherein the two ends of said horizontal flexible cable are connected to each other, forming a complete loop of said horizontal cable through the wall around the structure.

6. The structure of claim 1, wherein the two ends of said horizontal flexible cable are connected to the framework of the structure on either side of said at least one opening, forming an almost complete loop of said horizontal flexible cable through the wall around the structure, said loop excluding said opening in the structure.

7. The structure of claim 1, arranged such that a continuous network of the vertical and horizontal steel cables is formed within the at least one wall and at least one ceiling of the structure, and the cast material within the at least one wall and on top of the at least one ceiling encases said continuous network of steel cables, distributing disaster forces that may occur across the entire structure and strengthening the cohesive integrity of the structure.

8. A structure secured to a body of cast material which comprises:
   (a) an at least one wall;
   (b) an at least one ceiling;
   (c) an at least one opening respectively receiving at least one securable door;
   (d) an at least one vertical flexible cable having two ends, said at least one vertical flexible cable being looped around the entire structure in a plane, which is substantially perpendicular to the body of cast material, said at least one vertical flexible cable being at least partially within the at least one wall and at least partially within the at least one ceiling, and the two ends of said at least one vertical flexible cable are secured to the body of cast material, wherein the at least one flexible cable is comprised of steel;
   (e) an at least one horizontal flexible cable having two ends, said horizontal flexible cable being looped around the structure in a plane which is substantially parallel to the body of cast material and at least partially within the at least one wall, wherein the at least one flexible cable is comprised of steel; and
   (f) an at least one connector, said at least one connector connecting respective ends of said at least one horizontal flexible cable, said at least one connector being selected from the group consisting of clamps, sleeves, clips, crimps, turnbuckles, hooks, ball and strap fittings, strap forks, ball and shanks, threaded fittings, strap eyes, eyelet fittings, plugs, threaded plugs, ball end plugs, and ties.

9. The structure of claim 8, which further comprises an at least one wall corner form, said at least one wall corner form comprising a material selected from the group consisting of metal, wood, and cardboard and connected to the at least one wall.

10. The structure of claim 8, which further comprises an at least one panel, said at least one panel comprising a material selected from the group consisting of metal, wood, plastic, sheetrock and composite and affixed to the at least one wall.

11. The structure of claim 8 which further comprises a cast material within the at least one wall and on top of the at least one ceiling.

12. The structure of claim 8, wherein the two ends of said horizontal flexible cable are connected to each other, forming a complete loop of said horizontal flexible cable around the entire structure.

13. The structure of claim 8, wherein the two ends of said horizontal flexible cable are connected to the framework of the structure on either side of said at least one opening, forming an almost complete loop of said horizontal flexible cable through the wall around the structure, said loop excluding said opening in the structure.

14. The structure of claim 8, arranged such that a continuous network of the vertical and horizontal steel cables is formed within the at least one wall and at least one ceiling of the structure, and the cast material within the at least one wall and on top of the at least one ceiling encases said continuous network of steel cables, distributing disaster forces that may occur across the entire structure and strengthening the cohesive integrity of the structure.

\* \* \* \* \*